United States Patent
Chen

(10) Patent No.: US 10,831,067 B2
(45) Date of Patent: Nov. 10, 2020

(54) CURVED DISPLAY PANEL AND DEVICE

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/461,615

(22) PCT Filed: Sep. 5, 2017

(86) PCT No.: PCT/CN2017/100485
§ 371 (c)(1),
(2) Date: May 16, 2019

(87) PCT Pub. No.: WO2018/120904
PCT Pub. Date: Jul. 5, 2018

(65) Prior Publication Data
US 2020/0064695 A1    Feb. 27, 2020

(30) Foreign Application Priority Data

Dec. 28, 2016 (CN) .......................... 2016 1 1236941

(51) Int. Cl.
*G02F 1/1337* (2006.01)
*G02F 1/1343* (2006.01)
*G02F 1/1368* (2006.01)

(52) U.S. Cl.
CPC .. *G02F 1/133707* (2013.01); *G02F 1/134309* (2013.01); *G02F 1/1368* (2013.01);
(Continued)

(58) Field of Classification Search
CPC ......... G02F 1/134309; G02F 1/133707; G02F 1/133305; G02F 2001/133305; G02F 2001/133368; G02F 2201/56
See application file for complete search history.

(56) References Cited

U.S. PATENT DOCUMENTS

| | | |
|---|---|---|
| 2007/0468771 | 3/2007 | Lin et al. |
| 2013/0215373 A1* | 8/2013 | Naganuma ........... H04N 13/305 349/155 |

(Continued)

FOREIGN PATENT DOCUMENTS

| | | |
|---|---|---|
| CN | 104216181 A | 12/2014 |
| CN | 105629599 A | 6/2016 |

(Continued)

*Primary Examiner* — Michael H Caley
*Assistant Examiner* — Mariam Qureshi
(74) *Attorney, Agent, or Firm* — Muncy, Geissler, Olds & Lowe, P.C.

(57) ABSTRACT

A curved display panel and a curved display device are provided. By the design of changing the slit declination angles of the electrode slits relative to the edge of the pixel electrode, the slit declination angles of the electrode slits relative to the edge of the pixel electrode can change with a linear variation of a display device substrate. The pixel electrodes with different declination angles of the electrode slits are adopted on the device substrate at positions with different curvatures.

19 Claims, 6 Drawing Sheets

(52) U.S. Cl.
CPC .. *G02F 2201/121* (2013.01); *G02F 2201/123* (2013.01); *G02F 2201/56* (2013.01)

(56) References Cited

U.S. PATENT DOCUMENTS

2016/0238904 A1* 8/2016 Lee .................. G02F 1/133707
2016/0259211 A1* 9/2016 Lee .................. G02F 1/133707
2017/0287944 A1* 10/2017 Jiang .................. H01L 27/1218

FOREIGN PATENT DOCUMENTS

| CN | 105807497 A | 7/2016 |
| CN | 106681065 A | 5/2017 |

* cited by examiner

CURVED DISPLAY PANEL AND DEVICE

BACKGROUND

Technical Field

This disclosure relates to an electronic technical field, and more particularly relates to a curved display panel and device.

Related Art

More and more LCD panel applications need to use the curved display, and the curved technology is also slowly accepted by the user. Because the new watching experience can be provided, the curved displays have gradually become the new development directions including TVs, displays and mobile terminals, wherein the utility designs of the curved displays have been developed and researched by many designers. The color shift problems relating to the curved displays are also the research directions. The large viewing angle or front-view color shift becomes more obvious as the designed curvature gets larger.

SUMMARY

This disclosure provides a curved display device capable of improving a color shift problem of a curved display and enhancing the user's watching experience.

In one aspect, the present disclosure provides a curved display panel comprising an active device array substrate and a counter substrate. The active device array substrate has a plurality of pixel units. The pixel unit comprises an active device and a pixel electrode electrically connected to the active device and comprising an alignment pattern. The alignment pattern of the pixel electrode comprises a first alignment pattern and a second alignment pattern stacked together. The first alignment pattern and the second alignment pattern are the same and are parallelly staggered with a predetermined distance therebetween. The alignment pattern is constituted by electrode slits. The slit declination angles of the electrode slits relative to an edge of the pixel electrode change with a linear variation of a display device substrate.

In another aspect, the present disclosure provides a curved display panel comprising an active device array substrate and a counter substrate. The active device array substrate has a plurality of pixel units. The pixel unit comprises an active device and a pixel electrode electrically connected to the active device and comprising an alignment pattern. The alignment pattern of the pixel electrode comprises a first alignment pattern and a second alignment pattern stacked together. The first alignment pattern and the second alignment pattern are the same and are parallelly staggered with a distance of a half of a width of an electrode slit. The alignment pattern is constituted by the electrode slits. The slit declination angles of the electrode slits relative to an edge of the pixel electrode change with a linear variation of a display device substrate. The slit declination angles of the pixel electrode unitarily change an angle value every other fixed curvature on the active device array substrate. The slit declination angle symmetrically gradually tends to be smooth from a middle portion of the active device array substrate to two sides of the active device array substrate.

In another aspect, the present disclosure provides a curved display device comprising a backlight module and a curved display panel. The curved display panel comprises an active device array substrate and a counter substrate. The active device array substrate has a plurality of pixel units. The pixel unit comprises an active device and a pixel electrode electrically connected to the active device and comprising an alignment pattern. The alignment pattern is constituted by electrode slits. The slit declination angles of the electrode slits relative to an edge of the pixel electrode change with a linear variation of a display device substrate.

In the curved display panel and device of this disclosure, by the design of changing the slit declination angles of the electrode slits relative to the edge of the pixel electrode, the slit declination angles of the electrode slits relative to the edge of the pixel electrode can change with a linear variation of a display device substrate. The pixel electrodes with different declination angles of the electrode slits are adopted on the device substrate at positions with different curvatures to compensate the curvature change of the curved display and thus improve the color shift problem of the curved display at the positions with different curvatures.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

Figure 1:
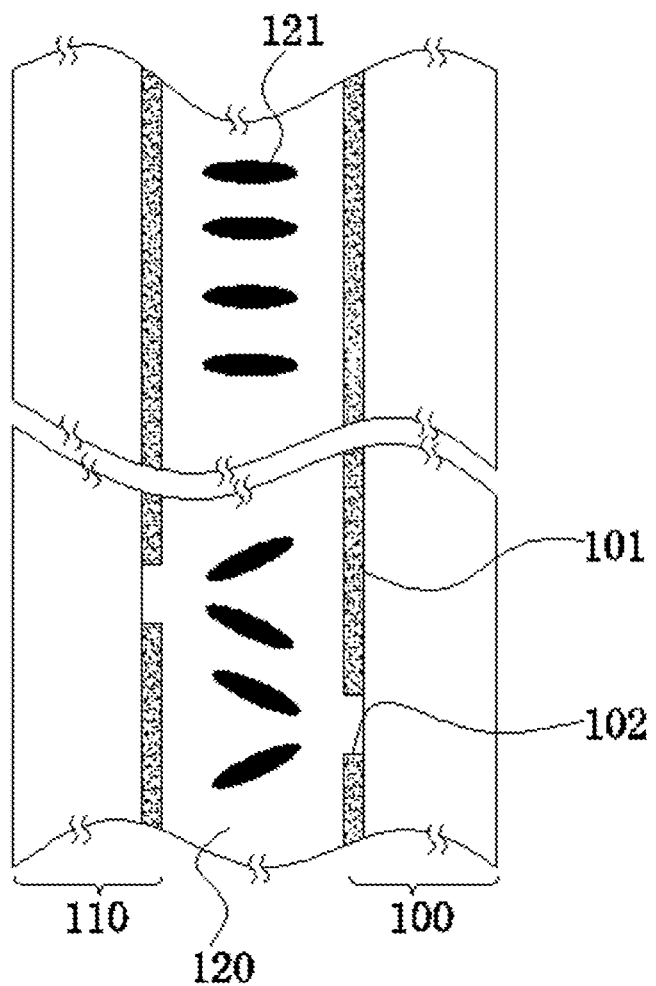
FIG. 1 is a partial cross-sectional side view showing a curved display panel provided by an embodiment of this disclosure.

It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof FIG. 1 is a partial cross-sectional side view showing a curved display panel 400 provided by an embodiment of this disclosure. Referring to FIG. 1, the curved display panel 400 may be, for example, a liquid crystal curved display panel. The curved display panel 400 includes an active device array substrate 100, a counter substrate 110 and a liquid crystal layer 120 interposed between the active device array substrate 100 and the counter substrate 110. The active device array substrate 100 has a plurality of pixel units 99, and the pixel unit 99 includes an active device 104 and a pixel electrode 101 electrically connected to the active device 104. The surface of the pixel electrode 101 includes an alignment pattern B constituted by electrode slits 102. Slit declination angles of the electrode slits 102 relative to the edge of the pixel electrode 101 change with a linear variation of a display device substrate.

Specifically, the liquid crystal layer 120 is interposed between the active device array substrate 100 and the counter substrate 110. An electric field is formed between the pixel electrode 101 of the pixel unit 99 on the active device array substrate 100 and the common electrode on the counter substrate 110, the orientations of liquid crystal molecules 121 in the liquid crystal layer 100 disposed therebetween are determined according to the felt electric field direction. Thus, changing the slit declination angles of the pixel electrode 101 correspondingly change the orientations of the liquid crystal molecules 121 at corresponding positions. The pixel electrodes 101 with different declination angles of the electrode slits 102 are adopted on the device substrate at positions with different curvatures to change the orientations of the liquid crystal molecules 121, compensate the curvature change of the curved display and thus improve the color shift problem of the curved display at the positions with different curvatures.

Further, the slit declination angles on the pixel electrodes 101 symmetrically change from a middle portion of the active device array substrate 100 to two sides of the active device array substrate 100.

Further, on the active device array substrate 100, the slit declination angles of the pixel electrode 101 unitarily change an angle value every other fixed curvature.

Figure 5:
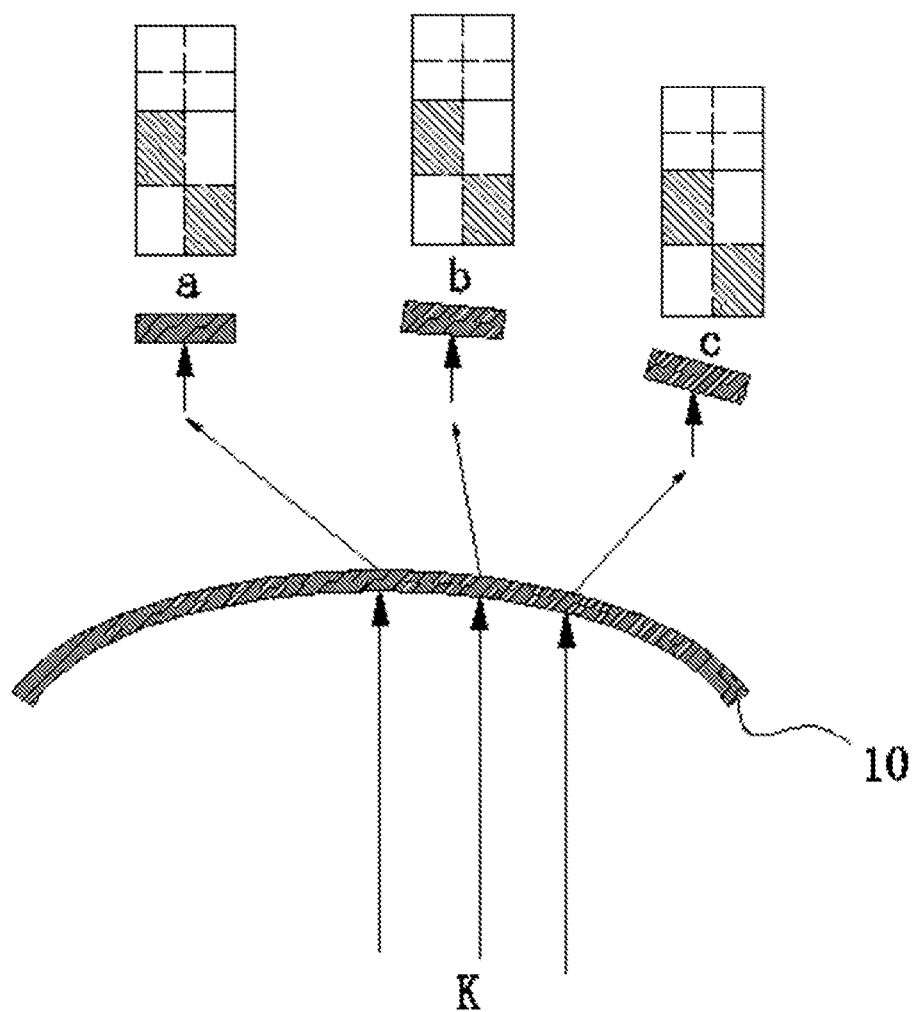
FIG. 5 is a schematic view showing a curved display panel provided by an embodiment of this disclosure.

Specifically, the declination angles of the electrode slits 102 change with the curvature change of the active device array substrate 100, and the declination angles of the electrode slits 102 unitarily change an angle value every other fixed curvature. For example, referring to FIGS. 1 and 5, the schematic angle in FIG. 5 is the top view, and the sight K is viewed from the location in front of a substrate 10 to the substrate 10, wherein three pixel electrodes 101 in the sight K are picked up for the purpose of illustration. As shown in the main view of FIG. 5, three pixel electrodes (a, b, c) 101 currently indicate the positions of the pixel electrodes 101 on the arc of the substrate 10, wherein the declination angles of the electrode slits 102 on the substrate 10 at the currently indicated positions are 45°, 43° and 41°, respectively.

Figure 4:
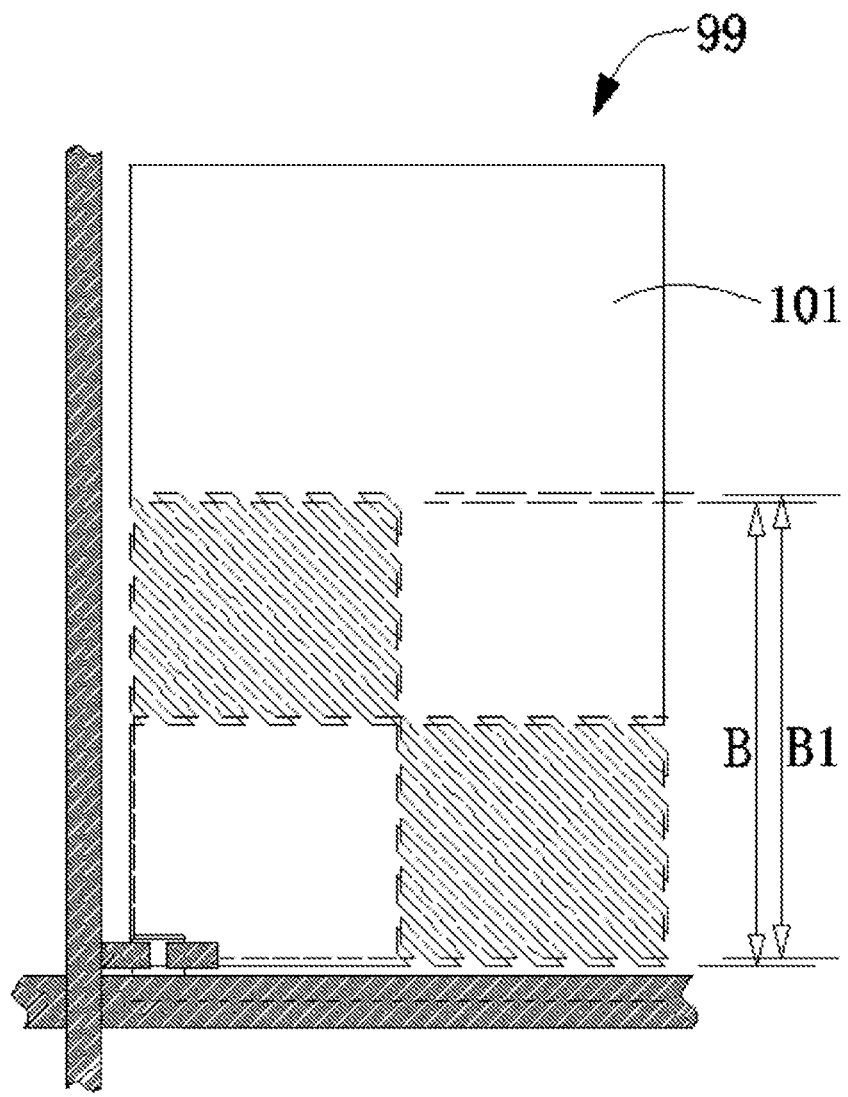
FIG. 4 is a partial main view showing another curved display panel provided by an embodiment of this disclosure.

FIG. 4 is a partial main view (i.e., a main view of the pixel electrode 99) showing another curved display panel 400 provided by an embodiment of this disclosure. Further, the alignment pattern of the pixel electrode 101 includes a first alignment pattern B and a second alignment pattern B1 stacked together, wherein the first alignment pattern B and the second alignment pattern B1 are the same and parallelly staggered with a predetermined distance therebetween.

Specifically, the resolution and the process width of the etch process ability of the exposure machine are limited at present. It is assumed that the process width limit is m (that is, the electrode slit 102 having only the width of m can be manufactured). If the two alignment patterns are staggered and stacked in this embodiment and the two electrode slits 102 partially overlap with each other, then the overlapped portion is the new electrode slit 102 having the smaller width. Thus, the electric field intensity at the electrode slit 102 can be further enhanced and the dark lines can be further decreased. The specific staggered distance may be, for example, one half of the width of the electrode slit 102.

Further, the alignment pattern comprises at least one slit distribution region.

Specifically, the alignment pattern may be composed of a plurality of slit distribution regions, and may be configured according to the actual requirement.

Further, the electrode slits of the alignment pattern are parallel and equally spaced smooth slits.

Figure 3:
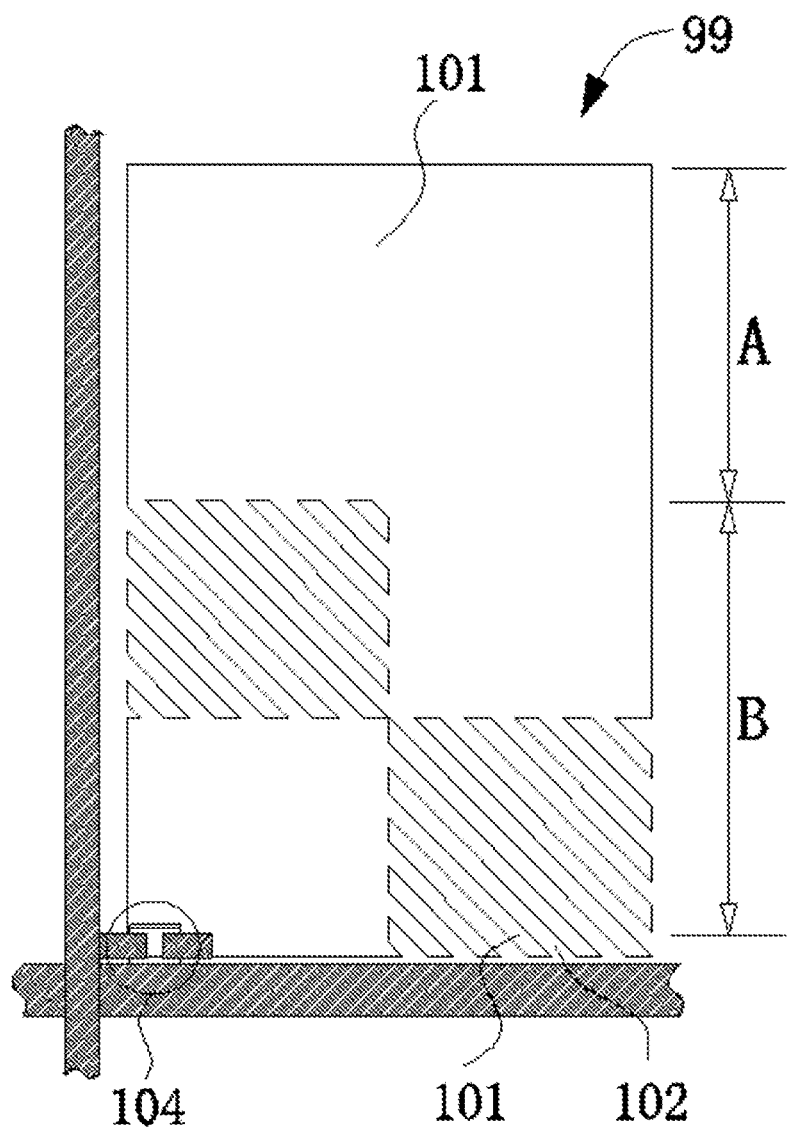
FIG. 3 is a partial main view showing a curved display panel provided by an embodiment of this disclosure.

Specifically, FIG. 3 is a partial main view (i.e., the main view of the pixel unit 99) showing a curved display panel 400 provided by an embodiment of this disclosure. As shown in FIG. 3, the surface of the pixel electrode 101 is divided into two regions A and B, wherein B is the alignment pattern including two distribution regions of electrode slits 102, and the electrode slits 102 are parallel to each other and equally spaced and have smooth slit edges.

Further, the area of the alignment pattern is larger than the area of the remaining area B of the surface of the pixel electrode.

Specifically, the pixel electrode exclusive of the remaining region A of the surface of the alignment pattern B pertains to the region where the front-view brightness is higher under the same voltage in this embodiment, wherein the smaller area of the bright region can obtain the better display quality. For example, if the area of the remaining region A is S, then the area of the alignment pattern B preferably ranges from 2S to 4S.

Figure 2:
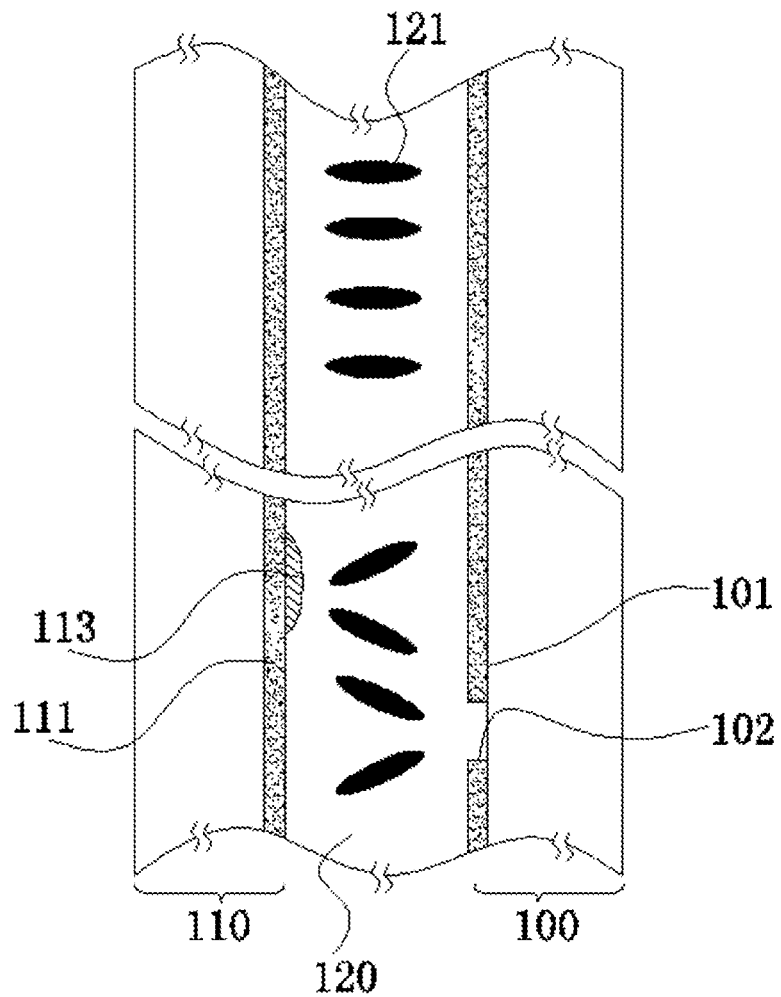
FIG. 2 is a partial cross-sectional side view showing another curved display panel provided by an embodiment of this disclosure.

Referring to FIG. 2, a plurality of alignment protrusions 113 are provided on the common electrode 111 of the counter substrate 110.

Specifically, a plurality of alignment protrusions 113 are provided on the surface of a common electrode 111 corresponding to the pixel electrode 101, wherein the provision of the alignment protrusions 113 can change the acting force distribution of the current region, and collocate with the design of the alignment pattern B to make the average inclination angle of the liquid crystal molecules 121 of the region be different from the average inclination angle of the liquid crystal molecules 121 in the region A, thereby implementing the different penetration rates of the liquid crystal layer 120 therebetween to improve the condition of the rapid change of the screen brightness with the change of the viewing angle.

Further, the slit declination angle symmetrically gradually tends to be smooth from a middle portion of the active device array substrate 100 to two sides of the active device array substrate 100.

Further, the pixel electrode 101 is made of a transparent electroconductive material.

Specifically, using the transparent electroconductive material to manufacture the pixel electrode (e.g., ITO electrode) can significantly decrease the number of dark lines when the electrode slits are formed.

Figure 6:
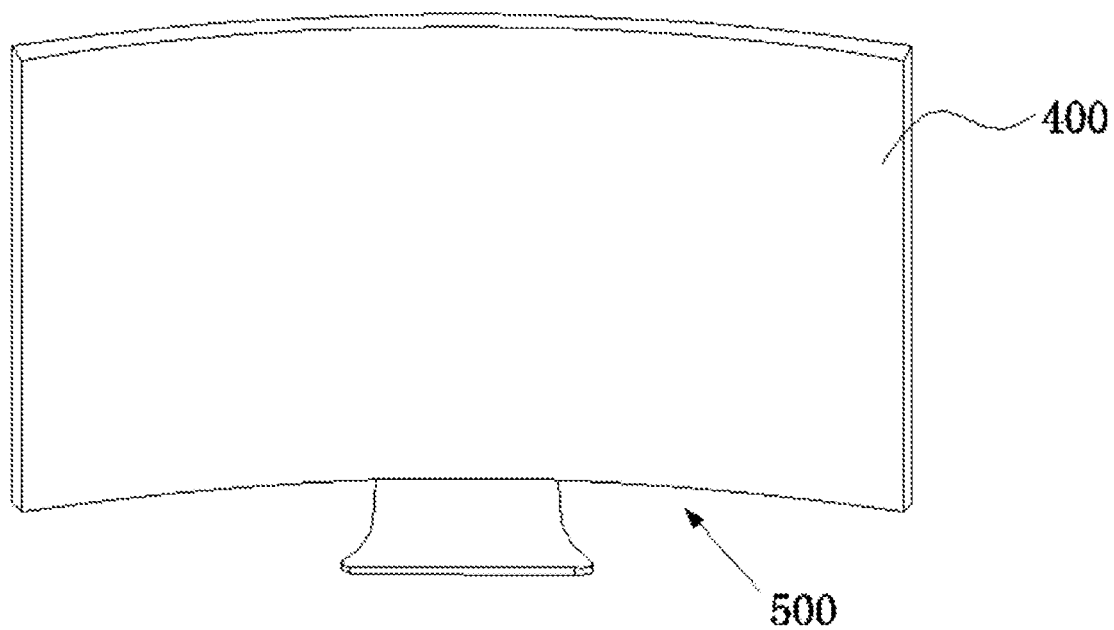
FIG. 6 is a schematic view showing a curved display device provided by an embodiment of this disclosure.

FIG. 6 is a schematic view showing a curved display device 500 provided by an embodiment of this disclosure. Referring to FIG. 6, the curved display device 500 includes a backlight module and a curved display panel 400. As shown in FIG. 1, the curved display panel 400 may be, for example, a liquid crystal curved display panel. The curved display panel 400 includes an active device array substrate 100, a counter substrate 110 and a liquid crystal layer 120 interposed between the active device array substrate 100 and the counter substrate 110. The active device array substrate 100 has a plurality of pixel units 99, and the pixel unit 99 includes an active device 104 and a pixel electrode 101 electrically connected to the active device 104. The surface of the pixel electrode 101 includes an alignment pattern B constituted by electrode slits 102. Slit declination angles of the electrode slits 102 relative to the edge of the pixel electrode 101 change with a linear variation of a display device substrate.

Specifically, the liquid crystal layer 120 is interposed between the active device array substrate 100 and the counter substrate 110. An electric field is formed between the pixel electrode 101 of the pixel unit 99 on the active device array substrate 100 and the common electrode on the counter substrate 110, the orientations of liquid crystal molecules 121 in the liquid crystal layer 100 disposed therebetween are determined according to the felt electric field direction. Thus, changing the slit declination angles of the pixel electrode 101 correspondingly change the orientations of the liquid crystal molecules 121 at corresponding positions. The pixel electrodes 101 with different declination angles of the electrode slits 102 are adopted on the device substrate at positions with different curvatures to change the orientations of the liquid crystal molecules 121, compensate the curvature change of the curved display and thus improve the color shift problem of the curved display at the positions with different curvatures.

Further, the slit declination angles on the pixel electrodes 101 symmetrically change from a middle portion of the active device array substrate 100 to two sides of the active device array substrate 100.

Further, on the active device array substrate 100, the slit declination angles of the pixel electrode 101 unitarily change an angle value every other fixed curvature.

Specifically, the declination angles of the electrode slits 102 change with the curvature change of the active device array substrate 100, and the declination angles of the electrode slits 102 unitarily change an angle value every other fixed curvature. For example, referring to FIGS. 1 and 5, the schematic angle in FIG. 5 is the top view, and the sight K is viewed from the location in front of a substrate 10 to the substrate 10, wherein three pixel electrodes 101 in the sight K are picked up for the purpose of illustration. As shown in the main view of FIG. 5, three pixel electrodes (a, b, c) 101 currently indicate the positions of the pixel electrodes 101 on the arc of the substrate 10, wherein the declination angles of the electrode slits 102 on the substrate 10 at the currently indicated positions are 45°, 43° and 41°, respectively.

In some embodiments, the curved display panel 400 may be, for example, a twisted nematic liquid crystal curved display panel, an in-plane switching liquid crystal curved display panel, a multi-domain vertical alignment liquid crystal curved display panel, an OLED curved display panel, a QLED curved display panel or any other display panel.

FIG. 4 is a partial main view (i.e., a main view of the pixel electrode 99) showing another curved display panel 400 provided by an embodiment of this disclosure. Further, the alignment pattern of the pixel electrode 101 includes a first alignment pattern B and a second alignment pattern B1 stacked together, wherein the first alignment pattern B and the second alignment pattern B1 are the same and parallelly staggered with a predetermined distance therebetween.

Specifically, the resolution and the process width of the etch process ability of the exposure machine are limited at present. It is assumed that the process width limit is m (that is, the electrode slit 102 having only the width of m can be manufactured). If the two alignment patterns are staggered and stacked in this embodiment and the two electrode slits 102 partially overlap with each other, then the overlapped portion is the new electrode slit 102 having the smaller width. Thus, the electric field intensity at the electrode slit 102 can be further enhanced and the dark lines can be further decreased. The specific staggered distance may be, for example, one half of the width of the electrode slit 102.

Further, the alignment pattern comprises at least one slit distribution region.

Specifically, the alignment pattern may be composed of a plurality of slit distribution regions, and may be configured according to the actual requirement.

Further, the electrode slits of the alignment pattern are parallel and equally spaced smooth slits.

Specifically, FIG. 3 is a partial main view (i.e., the main view of the pixel unit 99) showing a curved display panel 400 provided by an embodiment of this disclosure. As shown in FIG. 3, the surface of the pixel electrode 101 is divided into two regions A and B, wherein B is the alignment pattern including two distribution regions of electrode slits 102, and the electrode slits 102 are parallel to each other and equally spaced and have smooth slit edges.

Further, the area of the alignment pattern is larger than the area of the remaining area B of the surface of the pixel electrode.

Specifically, the pixel electrode exclusive of the remaining region A of the surface of the alignment pattern B pertains to the region where the front-view brightness is higher under the same voltage in this embodiment, wherein the smaller area of the bright region can obtain the better display quality. For example, if the area of the remaining region A is S, then the area of the alignment pattern B preferably ranges from 2S to 4S.

Referring to FIG. 2, a plurality of alignment protrusions 113 are provided on the common electrode 111 of the counter substrate 110.

Specifically, a plurality of alignment protrusions 113 are provided on the surface of a common electrode 111 corresponding to the pixel electrode 101, wherein the provision of the alignment protrusions 113 can change the acting force distribution of the current region, and collocate with the design of the alignment pattern B to make the average inclination angle of the liquid crystal molecules 121 of the region be different from the average inclination angle of the liquid crystal molecules 121 in the region A, thereby implementing the different penetration rates of the liquid crystal layer 120 therebetween to improve the condition of the rapid change of the screen brightness with the change of the viewing angle.

Further, the slit declination angle symmetrically gradually tends to be smooth from a middle portion of the active device array substrate 100 to two sides of the active device array substrate 100.

Further, the pixel electrode 101 is made of a transparent electroconductive material.

Specifically, using the transparent electroconductive material to manufacture the pixel electrode (e.g., ITO electrode) can significantly decrease the number of dark lines when the electrode slits are formed.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A curved display panel, comprising:
an active device array substrate including a plurality of pixel units, wherein each of the pixel unit comprises:
an active device, and a pixel electrode electrically connected to the active device and comprising an alignment pattern, wherein the alignment pattern of the pixel electrode comprises a first alignment pattern and a second alignment pattern stacked together, the first alignment pattern and the second alignment pattern are the same and are parallelly staggered with a predetermined distance therebetween, and the alignment pattern is constituted by electrode slits; and a counter substrate;

wherein slit declination angles of the electrode slits relative to an edge of the pixel electrode change with a linear variation of a display device substrate, the slit declination angles of all of the electrode slits symmetrically gradually decrease from a middle portion of the active device array substrate to two sides of the active device array substrate, wherein from the middle portion of the active device array substrate to the two sides of the active device array substrate, three of the slit declination angles are sequentially 45°, 43° and 41°.

2. The curved display panel according to claim 1, wherein the slit declination angles on the pixel electrode symmetrically change from a middle portion of the active device array substrate to two sides of the active device array substrate.

3. The curved display panel according to claim 2, wherein on the active device array substrate, the slit declination angle of the pixel electrode change based on a an fixed curvature of the active device array substrate.

4. The curved display panel according to claim 1, wherein the alignment pattern comprises at least one slit distribution region.

5. The curved display panel according to claim 1, wherein the electrode slits of the alignment pattern are parallel and equally spaced slits.

6. The curved display panel according to claim 1, wherein an area of the alignment pattern is larger than an area of a remaining region of the pixel electrode.

7. The curved display panel according to claim 1, wherein a plurality of alignment protrusions are disposed on a common electrode of the counter substrate.

8. The curved display panel according to claim 1, wherein the pixel electrode is made of a transparent electroconductive material.

9. A curved display device, comprising:

an active device array substrate including a plurality of pixel units, wherein the pixel unit comprises:
an active device, and
a pixel electrode electrically connected to the active device and comprising an alignment pattern, wherein the alignment pattern of the pixel electrode comprises a first alignment pattern and a second alignment pattern stacked together, the first alignment pattern and the second alignment pattern are the same and are parallelly staggered with a distance of a half of a width of an electrode slit, and the alignment pattern is constituted by the electrode slits; and a counter substrate;

wherein slit declination angles of the electrode slits relative to an edge of the pixel electrode change with a linear variation of a display device substrate, the slit declination angle of the pixel electrode change based on a fixed curvature of the active device array substrate, and the slit declination angles of all of the electrode slits symmetrically gradually decrease from a middle portion of the active device array substrate to two sides of the active device array substrate, wherein from the middle portion of the active device array substrate to the two sides of the active device array substrate, three of the slit declination angles are sequentially 45°, 43° and 41°.

10. The curved display device according to claim 9, wherein the alignment pattern comprises at least one slit distribution region.

11. The curved display device according to claim 9, wherein the slit declination angles on the pixel electrode symmetrically change from a middle portion of the active device array substrate to two sides of the active device array substrate.

12. A curved display device comprising a backlight module and a curved display panel, the curved display panel comprising:

an active device array substrate including a plurality of pixel units, wherein the pixel unit comprises:
an active device, and
a pixel electrode electrically connected to the active device and comprising an alignment pattern, wherein the alignment pattern is constituted by electrode slits; and a counter substrate;

wherein slit declination angles of the electrode slits relative to an edge of the pixel electrode change with a linear variation of a display device substrate, the slit declination angles of all of the electrode slits symmetrically gradually decrease from a middle portion of the active device array substrate to two sides of the active device array substrate, wherein from the middle portion of the active device array substrate to the two sides of the active device array substrate, three of the slit declination angles are sequentially 45°, 43° and 41°.

13. The curved display device according to claim 12, wherein the slit declination angles on the pixel electrode symmetrically change from a middle portion of the active device array substrate to two sides of the active device array substrate.

14. The curved display device according to claim 13, wherein on the active device array substrate, the slit declination angle of the pixel electrode change based on a fixed curvature of the active device array substrate.

15. The curved display device according to claim 12, wherein the alignment pattern comprises at least one slit distribution region.

16. The curved display device according to claim 12, wherein the electrode slits of the alignment pattern are parallel and equally spaced slits.

17. The curved display device according to claim 12, wherein an area of the alignment pattern is larger than an area of a remaining region of the pixel electrode.

18. The curved display device according to claim 12, wherein a plurality of alignment protrusions are disposed on a common electrode of the counter substrate.

19. The curved display device according to claim 12, wherein the pixel electrode is made of a transparent electroconductive material.

* * * * *